(12) United States Patent
Akl et al.

(10) Patent No.: US 12,047,910 B2
(45) Date of Patent: Jul. 23, 2024

(54) ENHANCED PAGING IN WIRELESS BACKHAUL NETWORKS

(71) Applicant: QUALCOMM Incorporated, San Diego, CA (US)

(72) Inventors: Naeem Akl, Somerville, NJ (US); Navid Abedini, Basking Ridge, NJ (US); Jianghong Luo, Skillman, NJ (US); Karl Georg Hampel, Hoboken, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 157 days.

(21) Appl. No.: 17/517,319

(22) Filed: Nov. 2, 2021

(65) Prior Publication Data
US 2023/0138717 A1 May 4, 2023

(51) Int. Cl.
*H04W 68/02* (2009.01)
(52) U.S. Cl.
CPC .................... *H04W 68/02* (2013.01)
(58) Field of Classification Search
CPC ...................................................... H04W 68/02

USPC ......................................................... 455/458
See application file for complete search history.

(56) References Cited

U.S. PATENT DOCUMENTS

| | | | |
|---|---|---|---|
| 10,039,081 B2* | 7/2018 | Zhang ................. | H04W 68/005 |
| 11,653,354 B2* | 5/2023 | Cirik ...................... | H04B 7/088 |
| | | | 370/329 |
| 2007/0249347 A1* | 10/2007 | Saifullah ............... | H04W 36/38 |
| | | | 455/436 |
| 2019/0394687 A1* | 12/2019 | Kowalski .......... | H04W 36/0061 |
| 2021/0258061 A1* | 8/2021 | Harrebek .............. | H04W 72/23 |

* cited by examiner

*Primary Examiner* — Joel Ajayi
(74) *Attorney, Agent, or Firm* — Holland & Hart LLP

(57) ABSTRACT

Methods, systems, and devices for wireless communications are described. A first wireless node may receive, at a mobile termination unit of the first wireless node, an indication of transmission of a first paging message to a second wireless node by a third wireless node. The indication may be received from a distributed unit of the third wireless node. A distributed unit of the first wireless node may transmit, based on receive the indication of transmission of the first paging message, a second paging message to the second wireless node. Receiving the indication of the first paging message may include receiving, by the mobile termination unit of the first wireless node, the first paging message that is transmitted to the second wireless node.

30 Claims, 10 Drawing Sheets

ENHANCED PAGING IN WIRELESS BACKHAUL NETWORKS

FIELD OF TECHNOLOGY

The following relates to wireless communications, including enhanced paging in wireless backhaul networks.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may support integrated access and backhaul (IAB) networks, which may reduce a number of fiber connections between base stations and a core network (CN). In some cases, IAB networks may include wireless backhaul connections, which may serve as relays, and connect each base station to the core network via one or more other base stations. The use of wireless backhaul connections instead of wireline backhaul links may reduce a cost associated with the deployment of fiber connections for wireline backhaul links. IAB networks may include base stations, which may be referred to as IAB donor nodes or IAB nodes depending on one or more functionalities (e.g., backhaul functionalities) associated with the base station. For example, an IAB donor node, which may also be referred to as a parent node, may be connected to the core network via a wireline backhaul link (e.g., a fiber connection). An IAB node (e.g., a non-donor node), which may also be referred to as a child node may be connected to the IAB donor node via one or more wireless backhaul links. An IAB network may implement paging procedures (e.g., paging messages and paging requests) to trigger radio resource control (RRC) connection setup between an IAB donor node and a user equipment (UE) or other IAB nodes. In some cases, paging procedures may utilize wireless backhaul links, which may consume network resources.

SUMMARY

The described techniques relate to improved methods, systems, devices, and apparatuses that support enhanced paging in wireless backhaul networks. Generally, the described techniques provide for a mobile termination unit of a wireless node receiving an indication of transmission of a first paging message that is sent to a second wireless node by a third wireless node. In some examples, the mobile termination unit of the first wireless node may receive the first paging message that is intended for the second wireless node. In other cases, the mobile termination unit may receive a request to page the second wireless node from the third wireless node. In response to receiving the indication of the transmission of the first paging message, a distributed unit of the first wireless node may transmit a second paging message to the second wireless node.

A method for wireless communication at a first wireless node is described. The method may include receiving, at a mobile termination unit of the first wireless node, an indication of transmission of a first paging message to a second wireless node by a third wireless node, wherein the indication of transmission of the first paging message is received from a distributed unit of the third wireless node and transmitting, by a distributed unit of the first wireless node and based at least in part on receiving the indication of transmission of the first paging message, a second paging message to the second wireless node.

An apparatus for wireless communication at a first wireless node is described. The apparatus may include a processor, memory coupled with the processor, and instructions stored in the memory. The instructions may be executable by the processor to cause the apparatus to receive, at a mobile termination unit of the first wireless node, an indication of transmission of a first paging message to a second wireless node by a third wireless node, wherein the indication of transmission of the first paging message is received from a distributed unit of the third wireless node and transmit, by a distributed unit of the first wireless node and based at least in part on receiving the indication of transmission of the first paging message, a second paging message to the second wireless node.

Another apparatus for wireless communication at a first wireless node is described. The apparatus may include means for receiving, at a mobile termination unit of the first wireless node, an indication of transmission of a first paging message to a second wireless node by a third wireless node, wherein the indication of transmission of the first paging message is received from a distributed unit of the third wireless node and means for transmitting, by a distributed unit of the first wireless node and based at least in part on receiving the indication of transmission of the first paging message, a second paging message to the second wireless node.

A non-transitory computer-readable medium storing code for wireless communication at a first wireless node is described. The code may include instructions executable by a processor to receive, at a mobile termination unit of the first wireless node, an indication of transmission of a first paging message to a second wireless node by a third wireless node, wherein the indication of transmission of the first paging message is received from a distributed unit of the third wireless node and transmit, by a distributed unit of the first wireless node and based at least in part on receiving the indication of transmission of the first paging message, a second paging message to the second wireless node.

In some examples of the method, apparatuses, and non-transitory computer-readable medium described herein, receiving the indication of transmission of the first paging message may include operations, features, means, or instructions for receiving, by the mobile termination unit of the first wireless node, the first paging message that may be transmitted to the second wireless node.

In some examples of the method, apparatuses, and non-transitory computer-readable medium described herein, receiving the indication of transmission of the first paging message may include operations, features, means, or instructions for receiving a paging identity of the second wireless node, wherein the paging identity comprises an inactive radio network temporary identifier or a serving temporary mobile subscriber identity of the second wireless node.

In some examples of the method, apparatuses, and non-transitory computer-readable medium described herein, receiving the indication of transmission of the first paging message may include operations, features, means, or instructions for receiving an indication of an index value that maps to an identity of the second wireless node.

Some examples of the method, apparatuses, and non-transitory computer-readable medium described herein may further include operations, features, means, or instructions for determining a paging frame to use to transmit the second paging message based at least in part on the index value, wherein the second paging message may be transmitted to the second wireless node using the paging frame.

In some examples of the method, apparatuses, and non-transitory computer-readable medium described herein, receiving the indication of transmission of the first paging message may include operations, features, means, or instructions for receiving a group paging identity that corresponds to a wireless node group including the first wireless node and the second wireless node.

In some examples of the method, apparatuses, and non-transitory computer-readable medium described herein, the group paging identity may be mapped to an identity of the mobile termination unit of the first wireless node and an identity of the second wireless node.

In some examples of the method, apparatuses, and non-transitory computer-readable medium described herein, receiving the indication of transmission of the first paging message may include operations, features, means, or instructions for receiving the first paging message that includes a first paging record identifying the second wireless node, a second paging record identifying the first wireless node, or both.

In some examples of the method, apparatuses, and non-transitory computer-readable medium described herein, receiving the indication of transmission of the first paging message may include operations, features, means, or instructions for receiving, from the third wireless node over a communication link established between the first wireless node and the third wireless node, a request to page the second wireless node, wherein the first wireless node transmits the second paging message based at least in part on receiving the request.

In some examples of the method, apparatuses, and non-transitory computer-readable medium described herein, the third wireless node may be a parent node of the first wireless node and the request may be received by the mobile termination unit of the first wireless node and from the distributed unit of the third wireless node.

In some examples of the method, apparatuses, and non-transitory computer-readable medium described herein, receiving the request may include operations, features, means, or instructions for receiving a downlink control information message, a medium access control layer control element message, a sidelink control information message, or backhaul adaptation protocol layer protocol data unit message.

In some examples of the method, apparatuses, and non-transitory computer-readable medium described herein, receiving the indication of transmission of the first paging message may include operations, features, means, or instructions for receiving an indication of one or more cell identifiers of cells served by the first wireless node, wherein the second paging message may be transmitted in the cells corresponding to the one or more cell identifiers.

In some examples of the method, apparatuses, and non-transitory computer-readable medium described herein, receiving the indication of transmission of the first paging message may include operations, features, means, or instructions for receiving an indication of paging information that includes a paging discontinuous reception cycle, a paging priority, a paging origin, or a combination thereof, wherein the second paging message may be transmitted based at least in part on the paging information.

In some examples of the method, apparatuses, and non-transitory computer-readable medium described herein, receiving the indication of transmission of the first paging message may include operations, features, means, or instructions for receiving an indication of a plurality of wireless nodes that may be to be paged, wherein the plurality of wireless nodes includes the second wireless node, wherein the second paging message includes indications of each wireless node of the plurality of wireless nodes.

Some examples of the method, apparatuses, and non-transitory computer-readable medium described herein may further include operations, features, means, or instructions for receiving a paging configuration for the first wireless node to use for paging other wireless nodes in response to receiving paging messages for the other wireless nodes, wherein the second paging message may be transmitted based at least in part on the paging configuration.

In some examples of the method, apparatuses, and non-transitory computer-readable medium described herein, receiving the paging configuration may include operations, features, means, or instructions for receiving a paging identity of the second wireless node, a configuration of a group paging identity of a wireless node group that includes at least the first wireless node and the second wireless node, or a combination thereof.

In some examples of the method, apparatuses, and non-transitory computer-readable medium described herein, receiving the paging configuration may include operations, features, means, or instructions for receiving, from a central unit, the paging configuration.

Some examples of the method, apparatuses, and non-transitory computer-readable medium described herein may further include operations, features, means, or instructions for monitoring, during one or more paging frames, for the first paging message that indicates the second wireless node, wherein the indication of transmission of the first paging message may be received based at least in part on the monitoring.

In some examples of the method, apparatuses, and non-transitory computer-readable medium described herein, the one or more paging frames may be monitored based at least in part on a paging configuration, one or more identities of wireless nodes served by the first wireless node, or a combination thereof.

In some examples of the method, apparatuses, and non-transitory computer-readable medium described herein, monitoring for the first paging message may include operations, features, means, or instructions for monitoring for the first paging message while the first wireless node may be in an inactive or an idle state.

In some examples of the method, apparatuses, and non-transitory computer-readable medium described herein, the third wireless node may be an integrated access and backhaul node or a distributed unit of a base station, the first wireless node may be an integrated access and backhaul node, and the second wireless node may be an integrated access and backhaul node or a user equipment.

DETAILED DESCRIPTION

Figure 1:
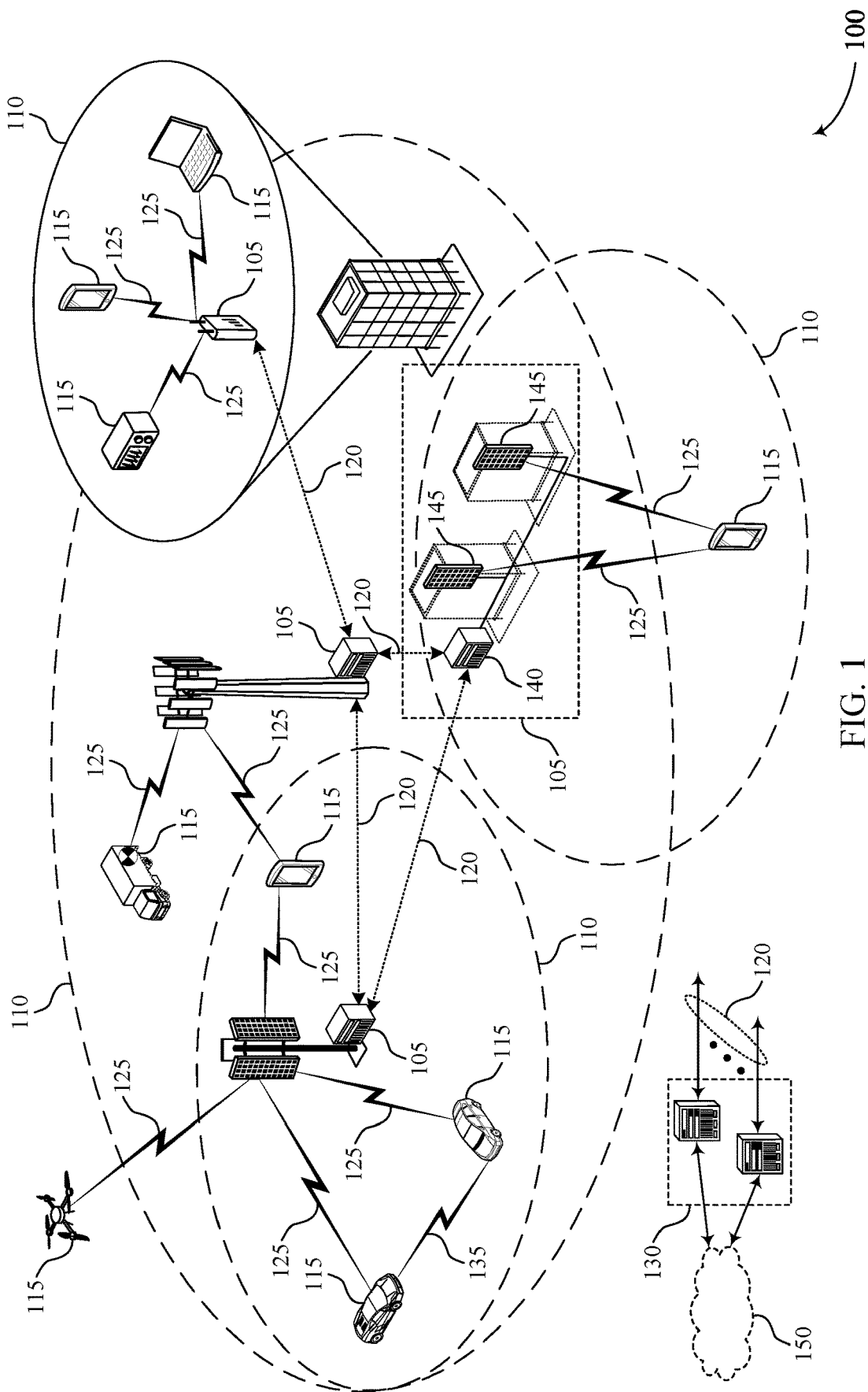
FIG. 1 illustrates an example of a wireless communications system that supports enhanced paging in wireless backhaul networks in accordance with aspects of the present disclosure.

In some wireless communications systems, each base station may be connected to a core network via a wireline backhaul link, which may be a fiber connection. In some other wireless communications systems, wireless backhaul connections may serve as relays, and connect each base station to the core network via one or more other base stations. The use of wireless backhaul connections instead of wireline backhaul links may reduce a cost associated with the deployment of fiber connections for wireline backhaul links. In some cases, a wireless network that implements wireless connections (e.g., backhaul connections) between base stations may be referred to as an integrated access and backhaul (IAB) network. IAB networks may include base stations, which may be referred to as IAB donor nodes or IAB nodes depending on one or more functionalities (e.g., backhaul functionalities) associated with the base station. For example, an IAB donor node, which may also be referred to as a parent node, may be connected to the core network via a wireline backhaul link (e.g., a fiber connection). An IAB node (e.g., a non-donor node), which may also be referred to as a child node may be connected to the IAB donor node via one or more wireless backhaul links. The IAB donor node may be split into or otherwise function in two wireless roles or as two entities. For example, the IAB donor node may include a central unit (CU) that controls the IAB network through configuration and a distributed unit (DU) that schedules child nodes. Similarly, the IAB node (e.g., the child node) may be split into or otherwise function in two wireless roles or as two entities. For example, the IAB node may include a mobile termination (MT) unit that is scheduled by its parent node and a DU that schedules child nodes. As described herein, the term "base station," "node," and "wireless node" may be used interchangeably. For example, the term "IAB donor node" may refer to a base station in an IAB network. Similarly, the term "IAB node" may refer to a base station in an IAB network.

An IAB network may implement paging procedures (e.g., paging messages and paging requests) to trigger radio resource control (RRC) connection setup between an IAB donor node and a user equipment (UE). In some cases, a CU (e.g., a CU of an IAB donor node) may request (e.g., via a paging request) that a DU (e.g., a DU of an IAB node) page a particular UE. In response the DU may transmit a paging message to the UE. In some cases, however, the UE may not be present in one of the cells served by the DU, and as such, the UE may not receive the paging message. In some cases, if the UE fails to establish a connection with the core network (e.g., via the IAB donor node) in response to the paging procedure, the CU may transmit another paging request to another DU (e.g., of another IAB node) via a wireless backhaul link. However, use of wireless backhaul links to transmit paging requests to DUs may consume significant resources (e.g., communication resources and power) and may result in increased latency.

Various aspects of the present disclosure relate to enhanced paging in wireless backhaul networks. For example, an MT unit may detect when UEs are paged by DUs and may trigger transmission of a paging message in response to detecting the paging. This technique may reduce signaling on the F1 interface between the CU and the DUs. To support these techniques, the MT units may be configured to listen for paging messages from DUs by monitoring paging resources during one or more paging frames for paging identifiers or explicit requests from DUs for the MT unit to page a UE. In some cases, the MT unit may receive (e.g., intercept) a paging message from a DU. The paging message may include an indication, which may include a paging identity, a pointer to a paging identity, a group paging identity, an index value, a paging request, a cell identifier (ID), a paging discontinuous reception (DRX) value, a paging priority, a paging origin, or a combination thereof. In some cases, the MT may determine to page one or more UEs based on the indication. These and other implementations are described in further detail with respect to the following figures.

Aspects of the disclosure are initially described in the context of wireless communications systems. Aspects of the disclosure are further illustrated by and described with reference to apparatus diagrams, system diagrams, and flowcharts that relate to enhanced paging in wireless backhaul networks.

FIG. 1 illustrates an example of a wireless communications system 100 that supports enhanced paging in wireless backhaul networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

Various aspects of the present disclosure relate to enhanced paging in wireless backhaul networks. For example, one or more of the base stations 105 may be configured as a wireless backhaul network, an IAB, or the like, and may include one or more backhaul functions or entities such as CU, DU, and MT as described herein. For example, an MT unit (e.g., of a base station 105) may detect when UEs 115 are paged by DUs (e.g., of a base station 105) and may transmit a paging message in response to detecting the paging. This technique may reduce signaling on the F1 interface between the CU and the DUs. To support these techniques, the MT units may be configured to listen for paging messages from DUs by monitoring paging resources during one or more paging frames for paging identifiers or explicit requests from DUs for the IAB nodes to page a UE 115. In some cases, the MT unit may receive a paging message from a DU. The paging message may include an indication, which may include a paging identity, a pointer to a paging identity, a group paging identity, an index value, a paging request, a cell ID, a paging DRX value, a paging priority, a paging origin, or a combination thereof. In some cases, the MT may determine to page one or more UEs 115 based on the indication.

Figure 2:
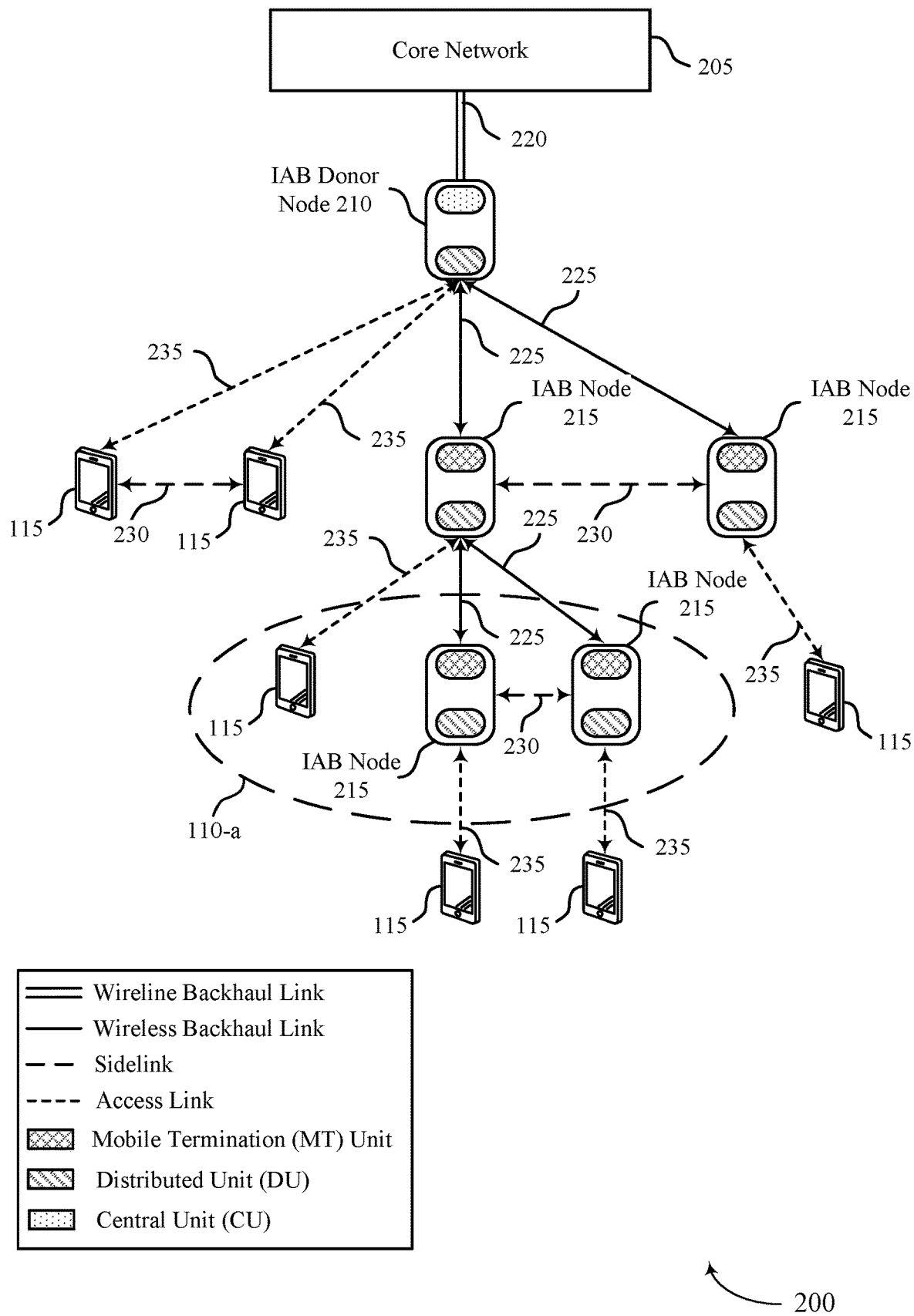
FIG. 2 illustrates an example of an integrated access and backhaul (IAB) network that supports enhanced paging in wireless backhaul networks in accordance with aspects of the present disclosure.

FIG. 2 illustrates an example of an IAB network 200 that supports enhanced paging in wireless backhaul networks in accordance with aspects of the present disclosure. In some examples, the IAB network 200 may implement aspects of the wireless communications system 100. The IAB network 200 may be a 5G NR system, such as an mmW system, and may supplement wireline backhaul connections, such as a wireline backhaul link 220, by sharing infrastructure and spectral resources for network access among devices that support wireless backhaul capabilities, providing an IAB network architecture.

For example, the IAB network 200 illustrates an IAB network architecture including a core network 205, an IAB donor node 210, a number of IAB nodes 215—which may be examples of IAB relay nodes—and a number of UEs 115. The IAB network 200 may support an overlay of access networks and backhaul networks between access nodes to enable communications between a UE 115 and the core network 205 via one or more wireless or wireline links. Such access networks may include communications between an access node, such as the IAB donor node 210 or an IAB node 215, and a UE 115 and such backhaul networks may include communications between different access nodes. In some cases, communications towards a UE 115 may be referred to as downstream communications and communications towards the core network 205 may be referred to as upstream communications. The IAB network 200 may additionally support sidelink communications between UEs via one or more sidelinks 230 and sidelink communications between IAB nodes 215 via one or more sidelinks 230.

The IAB network 200 may include one or more IAB donor nodes 210 that may function as an interface between a wireline network and a wireless network. For example, the IAB donor node 210 may include at least one wireline backhaul link 220 over which the IAB donor node 210 may communicate with the core network 205 and one or more wireless links, such as wireless backhaul links 225 or access links 235, over which the IAB donor node 210 may communicate with UEs 115 or IAB nodes 215 (e.g., child nodes). In some cases, the IAB donor node 210 may be referred to as an anchor node as a result of the wireline backhaul link 220 between the IAB donor node 210 and the core network 205. The IAB donor node 210 may be split into or otherwise function in two wireless roles or as two entities. For example, the IAB donor node 210 may be split into or otherwise function in a CU role and a DU role, where the DU associated with the IAB donor node 210 may be at least partially controlled by the associated CU of the IAB donor node 210. In some cases, the CU role and the DU role of the IAB donor node 210 may be different entities. In some other cases, the CU role and the DU role of the IAB donor node 210 may be included within the same entity, but may functionally operate as two different entities (e.g., the IAB donor node 210 may use different software if communicating via the CU role than if communicating via the DU role).

The CU of the IAB donor node 210 may support layer 3 (L3) functionality and signaling, such as RRC or packet data convergence protocol (PDCP) layer functions, and, in some cases, the IAB donor node 210 may control the IAB network through configuration signaling via the CU role. The DU of the IAB donor node 210 may perform lower layer operations, such as layer 1 (L1) or layer 2 (L2) functionality and signaling. For example, the DU of the IAB donor node 210 may perform radio link control (RLC), medium access control (MAC), or physical layer functions. In some cases, the IAB donor node 210, via the DU role, may control both the access links 235 and the wireless backhaul links 225 within an IAB network coverage area and may provide control information and scheduling information for descendent (e.g., child) IAB nodes 215 or UEs 115, or both. For example, the IAB donor node 210, via the DU role, may support an RLC channel connection with a UE 115 (via an access link 235) or with an IAB node 215 (via a wireless backhaul link 225).

The IAB nodes 215 also may be split into or otherwise function in two wireless roles or as two entities. For example, an IAB node 215 may be split into or otherwise function in a MT role and a DU role, where the MT role of the IAB node 215 may be at least partially controlled or scheduled by parent nodes, such as a parent IAB node 215 or the IAB donor node 210. In some cases, the MT role and the DU role of the IAB node 215 may be different entities. In some other cases, the MT role and the DU role of the IAB node 215 may be included within the same entity, but may functionally operate as two different entities (e.g., the IAB node 215 may use different software if communicating via the MT role than if communicating via the DU role). In some cases, the MT role of the IAB node 215 may be similar to a role performed by the UEs 115 within the IAB network 200. Additionally, in some cases, the IAB node 215 may not be directly connected to a wireline backhaul link 220. Instead, the IAB node 215 may connect to the core network 205 via other IAB nodes 215 (e.g., any number of additional IAB nodes 215 and the IAB donor node 210) using wireless backhaul links 225. As such, in examples in which the IAB node 215 functions as a relay node, the IAB node 215 may relay traffic to or from the IAB donor node 210 through one or multiple hops, where a quantity of the one or multiple hops may refer to the number of wireless backhaul links 225 connecting the IAB node 215 to the IAB donor node 210.

The DU of the IAB node 215 may be at least partially controlled by signaling messages from the CU of the IAB donor node 210 (e.g., an associated IAB donor node 210). In some cases, such signaling messages may be transmitted from the IAB donor node 210 to the IAB node 215 via an F1-application protocol (F1-AP) message. In some cases, an IAB donor node 210 may transmit one or more F1-AP messages over an F1 interface. Additionally, the DU role of the IAB node 215 may support a geographic coverage area 110-a of the IAB network coverage area and may provide scheduling information to the UEs 115 and the child IAB nodes 215 within the geographic coverage area 110-a. For example, the DU role of the IAB node 215 may perform the same or similar functions as the DU role of the IAB donor node 210 by controlling or scheduling communication over the access links 235 between the IAB node 215 and the UEs 115 within the geographic coverage area 110-a and the wireless backhaul links 225 between the IAB node 215 and the downstream IAB nodes 215 within the geographic coverage area 110-a. As described herein, the IAB node 215 may communicate upstream (e.g., towards the core network 205) in the IAB network 200 using the MT role of the IAB node 215 and may communicate downstream (e.g., towards a UE 115) in the IAB network 200 using the DU role of the IAB node 215.

The IAB network 200 may implement paging procedures to facilitate communications between IAB nodes 215 and UEs 115. For example, the IAB network 200 may implement paging procedures to trigger RRC connection setup between an IAB node 215 and a UE 115. In some cases, a paging procedure may provide paging information that enables a DU to page a UE 115. For example, a paging procedure may include an IAB donor node 210 transmitting a paging request to an IAB node 215 via a wireless backhaul link 225. Specifically, a CU (e.g., a CU of the IAB donor node 210) may transmit a paging request to a DU (e.g., a DU of an IAB node 215). In some cases, a paging request transmitted to an IAB node 215 by an IAB donor node 210 may be referred to as a paging message. The paging request may include a plurality of information elements (IEs).

The plurality of IEs of a paging request may include a message type, a UE identity index value, a paging identity (e.g., a RAN UE paging identity or a core CN UE paging identity), a paging DRX, a paging priority, a paging cell list (e.g., paging cell item IEs, an NR cell global identifier (CGI)), and a paging origin. In some cases, each IE may include one or more values, which may correspond to a state associated with the IE. In some cases, the message type may indicate that the message is a paging message. In some cases, one or more UEs 115 may be configured to operate in a power saving mode. While operating in the power saving mode, the UEs 115 may be capable of receiving paging messages during active frames. In some case, the UE identity index value of the paging request may indicate active frames. Accordingly, the UE identity index value may include a bitstring (e.g., 10 bits), which may be used by a DU to calculate one or more paging frames.

The paging identity of the paging request may indicate an identity of a UE 115 intended to receive a paging message from an IAB node 215. In some cases, an IAB donor node 210 may configure the paging identity. For example, the IAB donor node 210 may choose the paging identity based on a source of the paging request (e.g., the paging message may originate a CN or a RAN). The paging identity may be a RAN UE paging identity or a CN UE paging identity. In some cases, the UE 115 may be identified by the CN. Accordingly, the paging identity may be a CN paging identity. In some other cases, the IE associated with the paging identify may be a RAN UE paging identity. The paging identity may be indicated by a RAN UE if the UE 115 is in an inactive mode. In some cases, the RAN UE paging identity may include an inactive radio network temporary identifier (I-RNTI). The I-RNTI may be used to address a UE 115 within RRC signaling.

In some cases, the CN UE paging identity may be a 5G shortened temporary mobile subscriber identity (5G-S-TMSI), which may be a temporary identifier used by the CN. The paging request may include a paging priority, which may indicate a priority associated with a paging message between the IAB node 215 and the UE 115. For example, the paging priority may indicate if a paging message may be delayed. Additionally or alternatively, the paging priority may indicate if a paging message is urgent. In some cases, the paging request may include a paging cell list, which may indicate a quantity of cells. For example, an IAB node 215 may serve a plurality of cells. The IAB node 215 may receive the paging cell list, which may indicate one or more of the cells of the plurality of cells, and the IAB node 215 may determine to transmit a paging message to the indicated one or more cells based on receiving the paging cell list. The paging cell list may include one or more paging cell item IEs and an NR cell global identifier (CGI), which may indicate a unique global identity of a cell.

In some cases, the paging request may include a paging origin, which may indicate if a paging message originates based on protocol data unit (PDU) sessions (e.g., from non-3GPP access). A DU may receive a paging request including a paging origin and may determine to transfer the paging origin to a UE 115. In some cases, the paging request may include a paging DRX value. A DU may determine a final paging cycle of a UE 115 based on the paging DRX value. In some cases, a paging procedure may utilize signaling that is different from signaling utilized for communications with UEs 115.

A UE 115 may receive a paging message from an IAB node 215. For example, the UE 115 may receive the paging message from a DU of an IAB node 215. The IAB node 215 may transmit the paging message to the UE 115 based on receiving a paging request from an IAB donor node 210. In some cases, the UE 115 may operate according to an idle or inactive state (e.g., an RRC IDLE state or an RRC INACTIVE state). The IAB node 215 may transmit the paging message to the UE 115 to establish a communication link between the IAB node 215 and the UE 115. The network (e.g., the IAB node 215) may initiate the paging procedure by transmitting the paging message during a paging occasion (e.g., paging frame) for the UE 115. For example, the UE 115 may be configured to receiving paging messages periodically. In some cases, the UE 115 may be configured to receive paging messages according to a DRX cycle.

The paging message received by a UE 115 may include a quantity (e.g., a list) of paging records, which may include one or more paging identities. One or more UEs 115 may receive the paging message and may determine whether to decode the message based on one or more paging identities included in the paging records. In some cases, the network (e.g., the IAB node 215) may address multiple UEs 115 within a paging message by including a paging record (e.g., stored in a PagingRecord variable) for each UE 115. A paging message may include a pagingRecordList variable that includes a list of one or more paging records (e.g., PagingRecord variables). The PagingRecord variable may store one or more values corresponding to a UE identity (e.g., a paging identity). As discussed above, the paging identity may be included in a paging message transmitted between an IAB donor node 210 and an IAB node 215. The paging identity IE may include an I-RNTI or a 5G-S-TMSI.

The paging request between the IAB donor node 210 and the IAB node 215 may be transmitted over a wireless backhaul link 225, which may consume increased resources (e.g., communication resources and power resources) when compared to communications transmitted over access links 235. In some cases, the IAB node 215 may receive the paging request from the IAB donor node 210. The paging request may include a paging identity, which may indicate one or more UEs 115. In some cases, the IAB node 215 may receive the paging request and may transmit a paging message based on receiving the paging request. However, a UE 115 intended to receive the paging message may be located outside of the coverage area of the IAB node 215. Accordingly, the UE 115 may not receive the paging message, and the UE 115 may not establish a connection with the core network 205. As a result, the IAB donor node 210 may transmit one or more additional paging requests to one or more additional IAB nodes 215, which may consume additional resources.

Various aspects of the present disclosure are related to enhanced paging in wireless backhaul networks. For example, the IAB network 200 may minimize the consumption of resources (e.g., communication resources and power resources) by minimizing paging requests between IAB donor nodes 210 and IAB nodes 215. In accordance with various aspects of the present disclosure, an MT unit (e.g., an MT unit of a first IAB node 215) may detect a paging message transmitted by a DU (e.g., a DU of a second IAB node 215) to a UE 115. The DU of the first IAB node 215 may determine to retransmit the paging message (or transmit a corresponding new paging message) in response to the MT unit of the first IAB node 215 detecting the paging message. For example, the second IAB node 215 may transmit a paging message to a UE 115, however, the UE 115 may be located outside of a coverage area associated with the second IAB node 215 and may not receive the paging message. The first IAB node 215 may be located within the coverage area of the second IAB node 215 and may receive the paging message from the second IAB node 215. Specifically, the MT unit of the first IAB node 215 may receive the paging message. Based on receiving the paging message, the DU of the first IAB node 215 may transmit (e.g., retransmit) the paging message. The paging message may be received by the UE 115, which may be located within a coverage area associated with the first IAB node 215. Accordingly, the UE 115 may receive the paging message without additional paging requests transmitted by the IAB donor node 210.

Figure 3:
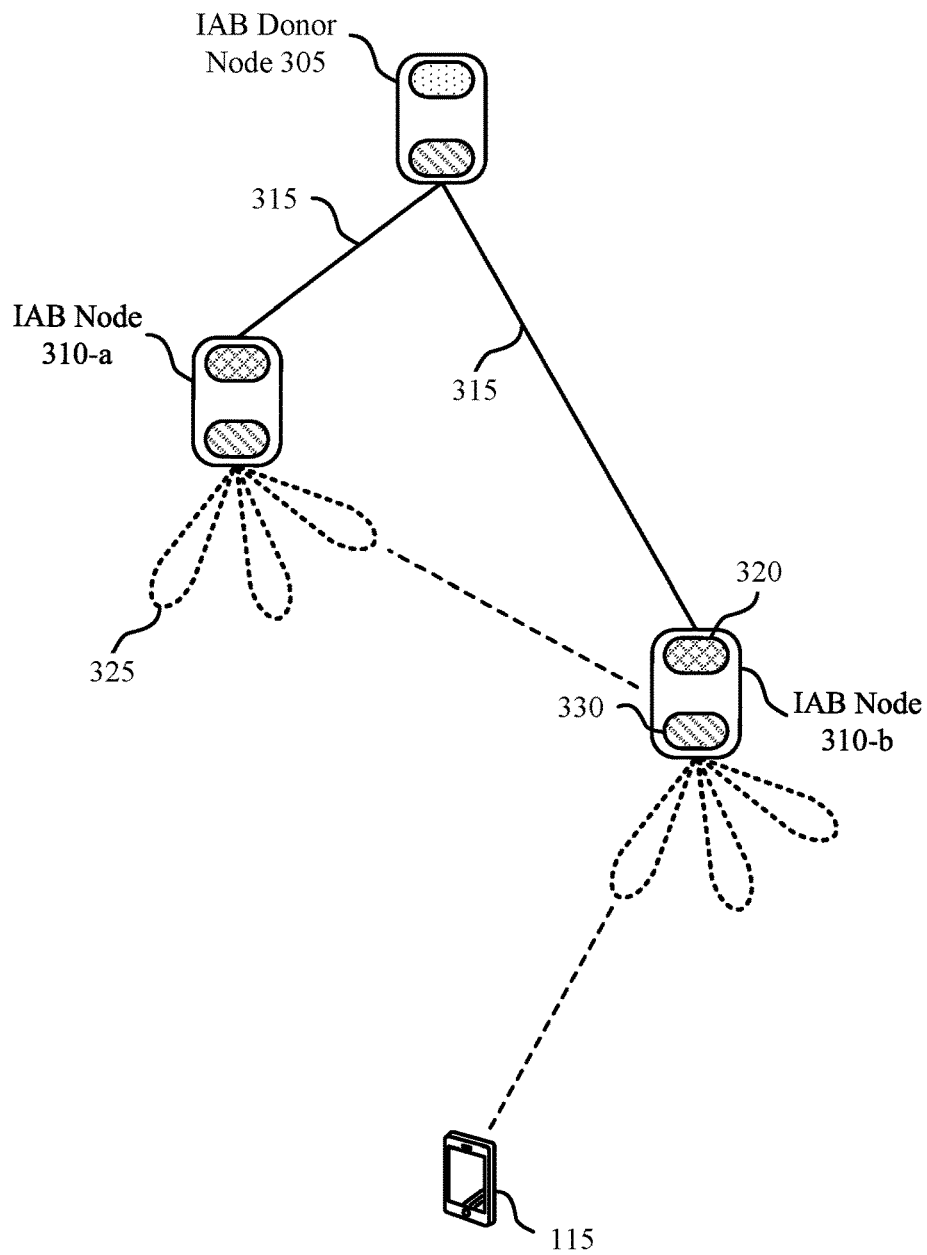
FIG. 3 illustrates an example of an IAB network that supports enhanced paging in wireless backhaul networks in accordance with aspects of the present disclosure.

FIG. 3 illustrates an example of an IAB network 300 that supports enhanced paging in wireless backhaul networks in accordance with aspects of the present disclosure. In some examples, the IAB network 300 may implement aspects of the wireless communications system 100 and the IAB network 200. The IAB network 300 may be a 5G NR system, such as an mmW system. The IAB network 300 illustrates an IAB network architecture including an IAB donor node 305, a number of IAB nodes 310 (which may be examples of IAB relay nodes), and a UE 115. The IAB network 300 may support an overlay of access networks and backhaul networks between access nodes to enable communications between a UE 115 and a core network via one or more wireless or wireline links. Such access networks may include communications between an access node, such as the IAB donor node 305 or an IAB node 310, and a UE 115 and such backhaul networks may include communications between different access nodes. In some cases, communications towards a UE 115 may be referred to as downstream communications and communications towards the core network may be referred to as upstream communications.

In some cases, the IAB donor node 305 may transmit a paging request to the IAB node 310-a. The IAB node 310-a may determine to transmit a paging message the UE 115 (e.g., on one or more associated cells) based on receiving the paging request from the IAB donor node 305. The IAB node 310-a may transmit the paging message using beamformed communications 325. In some cases, the UE 115 may not receive the paging message (e.g., the UE 115 may not be found). For example, the UE 115 may not be located within the one or more cells associated with the IAB node 310-a. As a result, the IAB donor node 305 may determine that the UE 115 did not receive the paging message. For example, the UE 115 may not establish a connection with the IAB donor node 305. As a result, the IAB donor node 305 may transmit a paging request to the IAB node 310-b. The IAB node 310-b may determine to transmit a paging message to the UE 115 based on receiving the paging request from the IAB donor node 305. However, the IAB donor node 305 transmitting a paging request to the IAB node 310-b may consume additional resources.

In accordance with aspects of the present disclosure, the IAB node 310-b may be configured to detect paging messages. For example, an MT unit 320 associated with the IAB node 310-b may receive an indication of the paging message transmitted to UE 115 from the IAB node 310-a. That is, in some cases, the MT unit 320 may receive the paging message transmitted by the IAB node 310-a. In some cases, the UE 115 may not receive the paging message (e.g., the UE 115 may not be found) and the IAB node 310-b (e.g., a DU 330 of the IAB node 310-b) may transmit the paging message to the UE 115. The IAB node 310-b may transmit the paging message using beamformed communications 325. In some cases, the IAB node 310-b may determine to transmit the paging message to the UE 115-b based on receiving the paging message from the IAB node 310-a. The IAB node 310-b may transmit the paging message to the UE 115-b on one or more cells associated with the IAB node 310-b. In some cases, the IAB node 310-b (e.g., the MT unit 320 of the IAB node 310-b) detecting paging messages may result in faster paging of the UE 115, when compared to the IAB node 310-b transmitting a paging message to the UE 115 based on a receiving a paging request from the IAB donor node 305. Additionally or alternatively, the IAB node 310-b detecting paging messages may result in reduced signaling on the F1 interface.

The paging message (or request to page) received by the MT unit 320 of the IAB node 310-b may include a paging identity associated with the UE 115. For example, the paging message may include an I-RNTI or a 5G-S-TMSI for the UE 115. Additionally or alternatively, the paging message may include a pointer to a paging identity of the UE 115. In some other cases, the paging message may include a group paging identity, which may be associated with a plurality of paging identities. The plurality of paging identities may include a paging identity associated with the MT unit 320 of the IAB node 310-b and a paging identity associated with the UE 115. In some cases, the IAB node 310-b may receive an indication of the IAB node 310-a paging the UE 115. The indication may be carried in the paging message or request transmitted by the IAB node 310-a. For example, the indication may be included in a downlink control information (DCI) message, MAC-CE message, or a backhaul adaption protocol (BAP) PDU message.

The IAB node 310-a (e.g., the DU of the IAB node 310-a) may transmit a paging message including a paging identity IE. The paging identity IE may indicate a potential destination associated with the paging message, such as the UE 115, or an MT unit 320 of the IAB node 310-b. Additionally or alternatively, the paging identity IE may indicate a plurality of potential destinations associated with the paging message. For example, the paging identity IE may indicate both the MT unit 320 of the IAB node 310-b and the UE 115. Accordingly, the MT unit 320 of the IAB node 310-b may monitor for paging messages transmitted to the UE 115 based on the paging identity IE included in the paging message. For example, the MT unit 320 of the IAB node 310-b may monitor for paging messages including a paging identity IE associated with the UE 115. Additionally or alternatively, the MT unit 320 of the IAB node 310-b may monitor for paging messages including a paging identity IE associated with the MT unit 320 of the IAB node 310-b. In some other cases, the MT unit 320 of the IAB node 310-b may monitor for paging messages including a group paging identity IE associated with both the UE 115 and the MT unit 320 of the IAB node 310-b. The MT unit 320 of the IAB node 310-b may receive a paging message from the IAB node 310-a and may determine to cause transmission of the paging message to the UE 115 based on the paging identity IE included in the paging message. In some cases, the MT unit 320 of the IAB node 310-b may receive a paging message (e.g., an enhanced paging message) transmitted to the IAB node 310-b from the IAB node 310-a. The paging message (e.g., the enhanced paging message) may trigger the DU of the IAB node 310-b to page the UE 115.

Although not depicted in FIG. 3, the IAB node 310-b may be a child node of the IAB node 310-a. Accordingly, a wireless backhaul link 315 may be established between the IAB node 310-a and the IAB node 310-b. In some cases, the IAB node 310-a may transmit a paging request to the IAB node 310-b. For example, the IAB node 310-a may transmit a paging request to the IAB node 310-b via a wireless backhaul link 315 or a sidelink. If the paging request is sent via the sidelink, the IAB node 310-a and the IAB node 310-b may or may not have a parent/child relationship. The IAB node 310-b may receive the paging request from the IAB node 310-a and may determine to page the UE 115 based on receiving the paging request. In some cases, the IAB node 310-b may not monitor for paging messages. Accordingly, the IAB node 310-b may be capable of receiving paging requests (e.g., from the IAB node 310-a) despite not monitoring for paging messages. In some cases, the IAB node 310-b may be capable of receiving paging requests while in an idle or inactive state.

Figure 4:
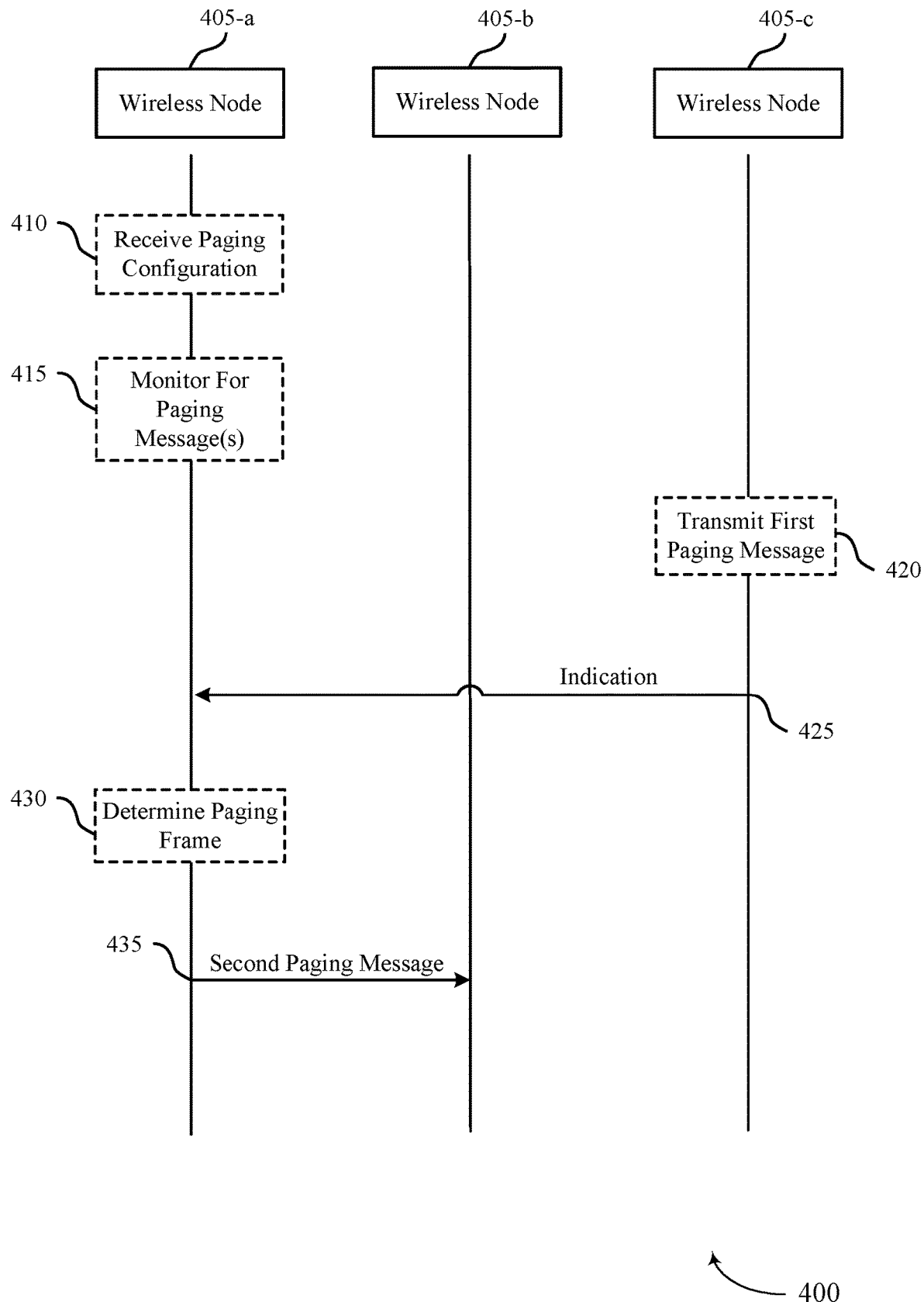
FIG. 4 illustrates an example of a process flow that supports enhanced paging in wireless backhaul networks in accordance with aspects of the present disclosure.

FIG. 4 illustrates an example of a process flow 400 that supports enhanced paging in wireless backhaul networks in accordance with aspects of the present disclosure. In some examples, the process flow 400 may implement aspects of the wireless communications system 100 or the IAB network 200. The process flow 400 may illustrate communication between wireless nodes 405, which may be examples of IAB nodes 310 or UEs 115 as illustrated with reference to FIG. 3. Alternative examples of the following may be implemented, where some processes are performed in a different order than described or are not performed at all. In some implementations, processes may include additional features not mentioned below, or further processes may be added.

At 410, a wireless node 405-a may receive a paging configuration for the wireless node 405 to use for paging other wireless nodes 405 in response to receiving paging messages for the other wireless nodes 405. In some cases, receiving the paging configuration may include receiving a paging identity of a wireless node 405-b, a configuration of a group paging identity of a wireless node group that includes at least the wireless node 405-a and the wireless node 405-b, or a combination thereof. For example, the paging configuration may include a mapping of an identify of the wireless node 405-a and/or the wireless node 405-b to the group paging identity. In some cases, receiving the paging configuration may include receiving the paging configuration from a central unit.

At 415, the wireless node 405-a may monitor during one or more paging frames, for the first paging message that indicates the wireless node 405-b, where the indication of the first paging message is received based on the monitoring. In some cases, the one or more paging frames are monitored based on a paging configuration, one or more identities of wireless nodes served by the wireless node 405-a, group paging identities configured at the wireless node 405-a, or a combination thereof. In some cases, monitoring for the first paging message may include monitoring for the first paging message while the wireless node 405-a is in an inactive or an idle state.

At 420, a wireless node 405-c may transmit the first paging message. In some cases, the first paging message may be transmitted to one or more UEs. Additionally or alternatively, the first paging message may be transmitted to one or more wireless nodes 405. In some cases, the first paging message may not be received. For example, the wireless node 405-c may transmit the first paging message to a UE that may not be within a coverage area of the wireless node 405-c.

At 425, the wireless node 405-a may receive at a mobile termination unit of the wireless node 405-a, an indication of transmission of a first paging message to the wireless node 405-b by the wireless node 405-c, where the indication of transmission of the first paging message is received from a distributed unit of the wireless node 405-c. In some cases, receiving the indication of transmission of the first paging message may include receiving, by the mobile termination unit of the wireless node 405-a, the first paging message that is transmitted to the wireless node 405-b. Additionally or alternatively, receiving the indication of transmission of the first paging message may include receiving a paging identity of the wireless node 405-b, where the paging identity includes an inactive radio network temporary identifier or a serving temporary mobile subscriber identity of the wireless node 405-b. Receiving the indication may additionally or alternatively include receiving an indication of an index value that maps to an identity of the wireless node 405-b.

In some cases, receiving the indication of transmission of the first paging message may include receiving a group paging identity that corresponds to a wireless node group including the wireless node 405-a and the wireless node 405-b. The group paging identity may be mapped to an identity of the mobile termination unit of the wireless node 405-a and an identity of the wireless node 405-b. In some cases, receiving the indication of transmission of the first paging message may include receiving the first paging message that includes a first paging record identifying the wireless node 405-b, a second paging record identifying the wireless node 405-a, or both. Additionally or alternatively, receiving the indication of transmission of the first paging message may include receiving, from the wireless node 405-c, over a communication link established between the wireless node 405-a and the wireless node 405-c, a request to page the wireless node 405-b. In some cases, the wireless node 405-c is a parent node of the wireless node 405-a and the request is received by the mobile termination unit of the wireless node 405-a and may be from the distributed unit of the wireless node 405-c (e.g., over a wireless backhaul link or a sidelink). In some cases, receiving the request may include receiving a downlink control information message, a medium access control layer control element message, a sidelink control information message, or backhaul adaptation protocol layer protocol data unit message.

In some cases, receiving the indication of transmission of the first paging message may include receiving an indication of one or more cell identifiers of cells served by the wireless node 405-a. Additionally or alternatively, receiving the indication of transmission of the first paging message may include receiving an indication of paging information that includes a paging discontinuous reception cycle, a paging priority, a paging origin, or a combination thereof. In some other cases, receiving the indication of transmission of the first paging message may include receiving an indication of a plurality of wireless nodes 405 that are to be paged, where the plurality of wireless nodes 405 includes the wireless node 405-b.

At 430, the wireless node 405-a may determine a paging frame to use to transmit the second paging message based on the index value.

At 435, the wireless node 405-a may transmit, by a distributed unit of the wireless node 405-a and based on receiving the indication of transmission of the first paging message, a second paging message to the wireless node 405-b. The second paging message may be transmitted based on information included in the indication of the first paging message received by the wireless node 405-a. For example, the second paging message may be transmitted in cells corresponding to cell identifiers included in the indication of the first paging message. Additionally or alternatively, the second paging message may be transmitted based on paging information (e.g., paging discontinuous reception cycle, a paging priority, a paging origin) included in the indication of the first paging message. Additionally or alternatively, the second paging message may include indications of each wireless node of a plurality of wireless nodes indicated by the first paging message. In some cases, the wireless node 405-a and the wireless node 405-b are integrated access and backhaul network nodes, and the wireless node 405-b is an integrated access and backhaul node or a UE.

Figure 5:
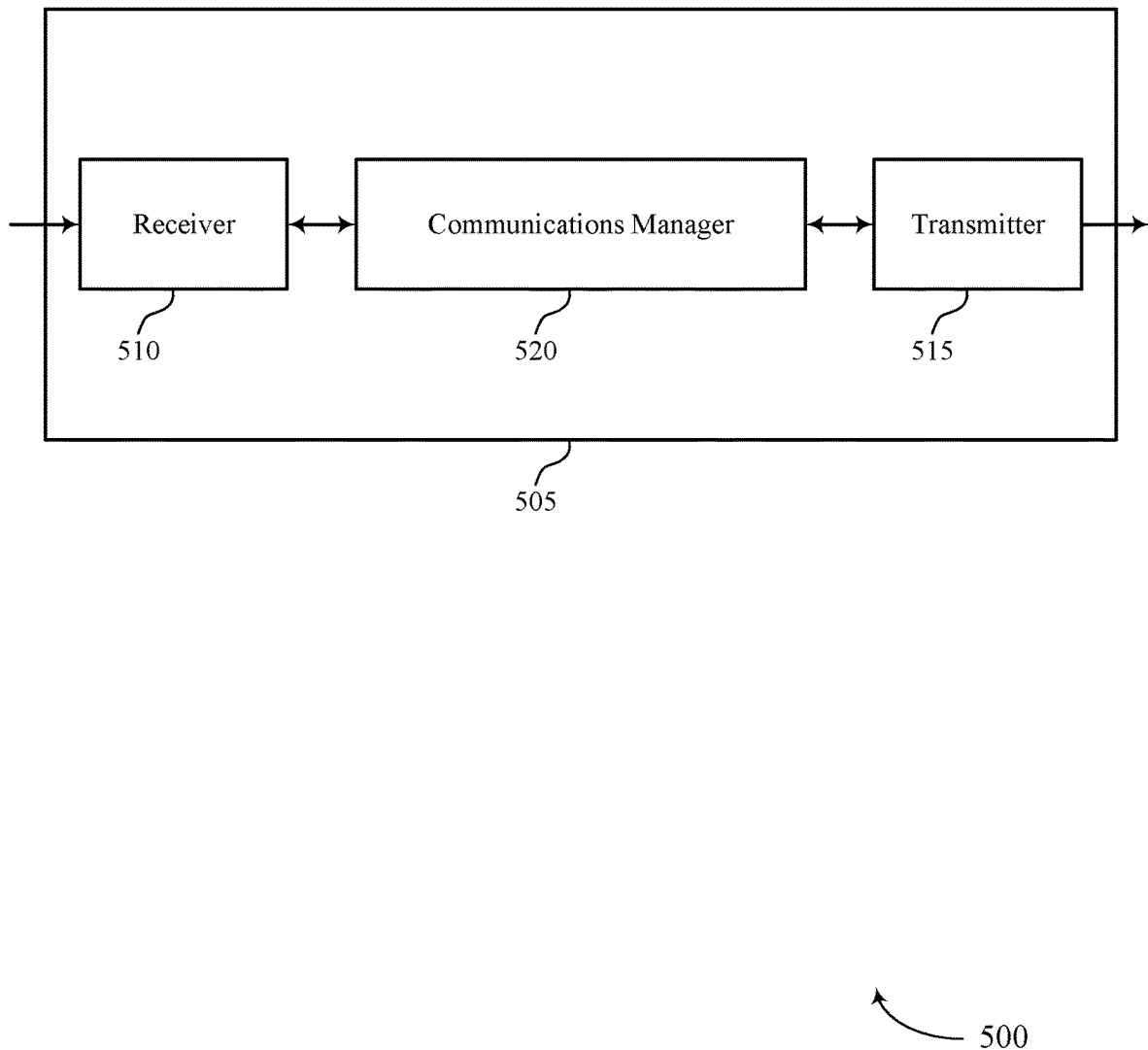
FIGS. 5 and 6 show block diagrams of devices that support enhanced paging in wireless backhaul networks in accordance with aspects of the present disclosure.

FIG. 5 shows a block diagram 500 of a device 505 that supports enhanced paging in wireless backhaul networks in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to enhanced paging in wireless backhaul networks). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to enhanced paging in wireless backhaul networks). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of enhanced paging in wireless backhaul networks as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an ASIC, a field programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a first wireless node in accordance with examples as disclosed herein. For example, the communications manager 520 may be configured as or otherwise support a means for receiving, at a mobile termination unit of the first wireless node, an indication of transmission of a first paging message to a second wireless node by a third wireless node, where the indication of transmission of the first paging message is received from a distributed unit of the third wireless node. The communications manager 520 may be configured as or otherwise support a means for transmitting, by a distributed unit of the first wireless node and based on receiving the indication of transmission of the first paging message, a second paging message to the second wireless node.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for reduced power consumption, improved communication reliability, more efficient utilization of communication resources, and improved coordination between devices. For example, the device 505 may support reduced power consumption associated with paging procedures. The techniques for reduced power consumption may allow the device 505 to reducing the processing overhead at the device 505 and more efficiently transmit paging messages. Additionally or alternatively, the paging procedures described herein may support enhanced communications for the device 505 improving data throughput and reducing an amount of time that the processing units of the device 505 remain powered on for handling wireless communications, further reducing the processing overhead at the device 505.

Figure 6:
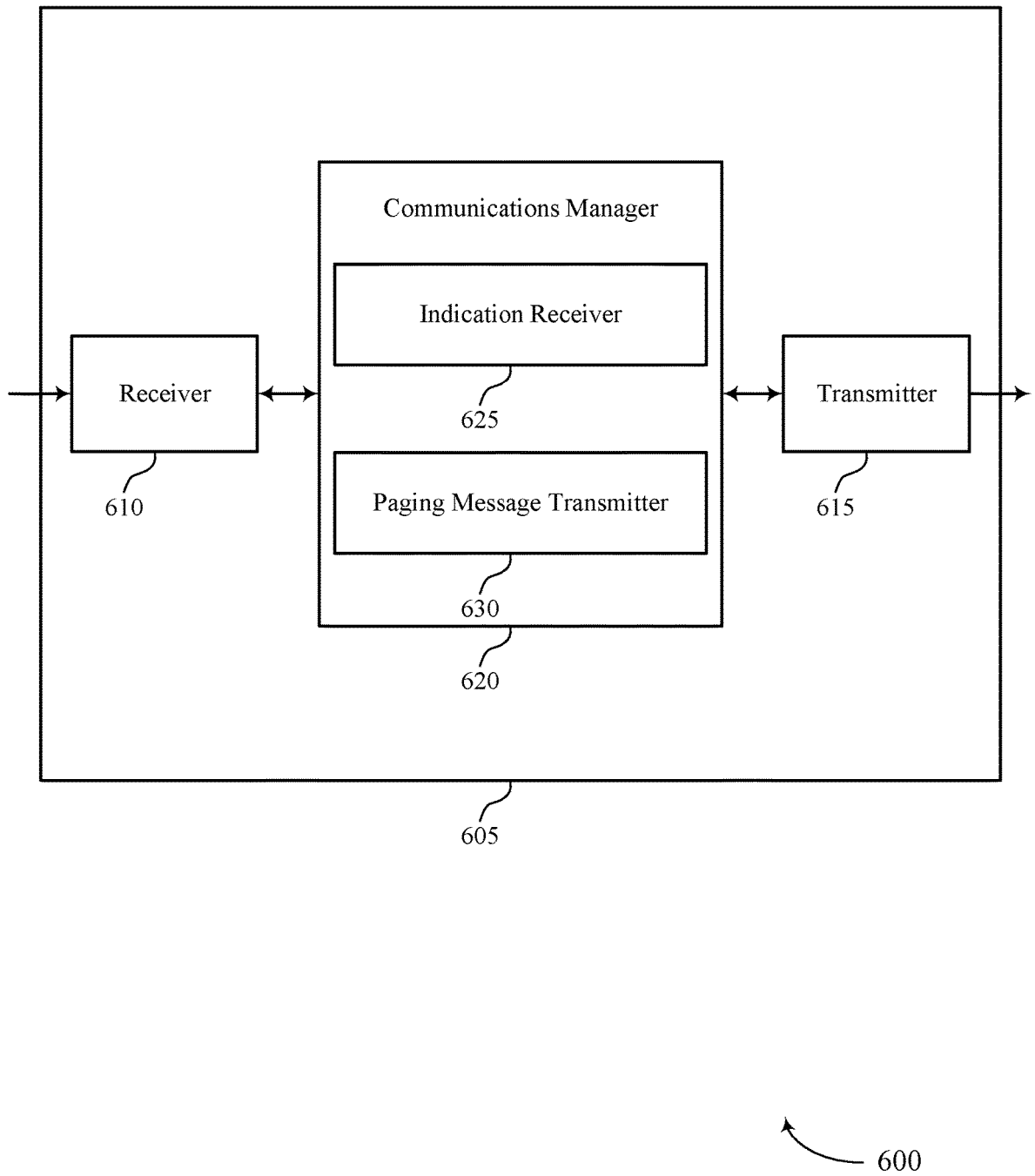

FIG. 6 shows a block diagram 600 of a device 605 that supports enhanced paging in wireless backhaul networks in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to enhanced paging in wireless backhaul networks). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to enhanced paging in wireless backhaul networks). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of enhanced paging in wireless backhaul networks as described herein. For example, the communications manager 620 may include an indication receiver 625 a paging message transmitter 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first wireless node in accordance with examples as disclosed herein. The indication receiver 625 may be configured as or otherwise support a means for receiving, at a mobile termination unit of the first wireless node, an indication of transmission of a first paging message to a second wireless node by a third wireless node, where the indication of transmission of the first paging message is received from a distributed unit of the third wireless node. The paging message transmitter 630 may be configured as or otherwise support a means for transmitting, by a distributed unit of the first wireless node and based on receiving the indication of transmission of the first paging message, a second paging message to the second wireless node.

Figure 7:
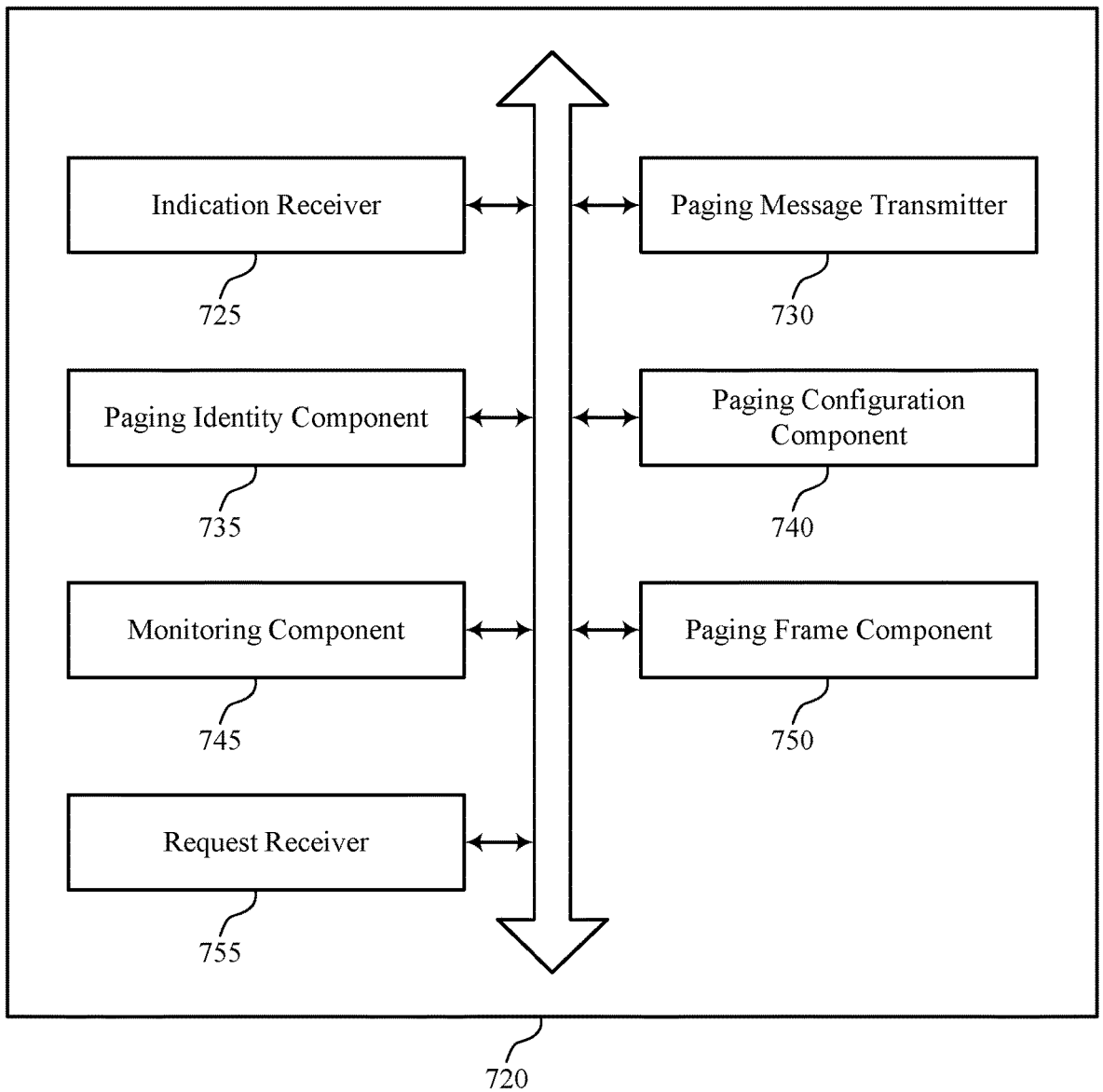
FIG. 7 shows a block diagram of a communications manager that supports enhanced paging in wireless backhaul networks in accordance with aspects of the present disclosure.

FIG. 7 shows a block diagram 700 of a communications manager 720 that supports enhanced paging in wireless backhaul networks in accordance with aspects of the present disclosure. The communications manager 720 may be an example of aspects of a communications manager 520, a communications manager 620, or both, as described herein. The communications manager 720, or various components thereof, may be an example of means for performing various aspects of enhanced paging in wireless backhaul networks as described herein. For example, the communications manager 720 may include an indication receiver 725, a paging message transmitter 730, a paging identity component 735, a paging configuration component 740, a monitoring component 745, a paging frame component 750, a request receiver 755, or any combination thereof. Each of these components may communicate, directly or indirectly, with one another (e.g., via one or more buses).

The communications manager 720 may support wireless communication at a first wireless node in accordance with examples as disclosed herein. The indication receiver 725 may be configured as or otherwise support a means for receiving, at a mobile termination unit of the first wireless node, an indication of transmission of a first paging message to a second wireless node by a third wireless node, where the indication of transmission of the first paging message is received from a distributed unit of the third wireless node. The paging message transmitter 730 may be configured as or otherwise support a means for transmitting, by a distributed unit of the first wireless node and based on receiving the indication of transmission of the first paging message, a second paging message to the second wireless node.

In some examples, to support receiving the indication of transmission of the first paging message, the indication receiver 725 may be configured as or otherwise support a means for receiving, by the mobile termination unit of the first wireless node, the first paging message that is transmitted to the second wireless node.

In some examples, to support receiving the indication of transmission of the first paging message, the indication receiver 725 may be configured as or otherwise support a means for receiving a paging identity of the second wireless node, where the paging identity includes an inactive radio network temporary identifier or a serving temporary mobile subscriber identity of the second wireless node.

In some examples, to support receiving the indication of transmission of the first paging message, the indication receiver 725 may be configured as or otherwise support a means for receiving an indication of an index value that maps to an identity of the second wireless node.

In some examples, the paging frame component 750 may be configured as or otherwise support a means for determining a paging frame to use to transmit the second paging message based on the index value, where the second paging message is transmitted to the second wireless node using the paging frame.

In some examples, to support receiving the indication of transmission of the first paging message, the paging identity component 735 may be configured as or otherwise support a means for receiving a group paging identity that corresponds to a wireless node group including the first wireless node and the second wireless node.

In some examples, the group paging identity is mapped to an identity of the mobile termination unit of the first wireless node and an identity of the second wireless node.

In some examples, to support receiving the indication of transmission of the first paging message, the indication receiver 725 may be configured as or otherwise support a means for receiving the first paging message that includes a first paging record identifying the second wireless node, a second paging record identifying the first wireless node, or both.

In some examples, to support receiving the indication of transmission of the first paging message, the indication receiver 725 may be configured as or otherwise support a means for receiving, from the third wireless node over a communication link established between the first wireless node and the third wireless node, a request to page the second wireless node, where the first wireless node transmits the second paging message based on receiving the request.

In some examples, the third wireless node is a parent node of the first wireless node and the request is received by the mobile termination unit of the first wireless node and from the distributed unit of the third wireless node.

In some examples, to support receiving the request, the request receiver 755 may be configured as or otherwise support a means for receiving a downlink control information message, a medium access control layer control element message, a sidelink control information message, or backhaul adaptation protocol layer protocol data unit message.

In some examples, to support receiving the indication of transmission of the first paging message, the indication receiver 725 may be configured as or otherwise support a means for receiving an indication of one or more cell identifiers of cells served by the first wireless node, where the second paging message is transmitted in the cells corresponding to the one or more cell identifiers.

In some examples, to support receiving the indication of transmission of the first paging message, the indication receiver 725 may be configured as or otherwise support a means for receiving an indication of paging information that includes a paging discontinuous reception cycle, a paging priority, a paging origin, or a combination thereof, where the second paging message is transmitted based on the paging information.

In some examples, to support receiving the indication of transmission of the first paging message, the indication receiver 725 may be configured as or otherwise support a means for receiving an indication of a set of multiple wireless nodes that are to be paged, where the set of multiple wireless nodes includes the second wireless nodes, where the second paging message includes indications of each wireless node of the set of multiple wireless nodes.

In some examples, the paging configuration component 740 may be configured as or otherwise support a means for receiving a paging configuration for the first wireless node to use for paging other wireless nodes in response to receiving paging messages for the other wireless nodes, where the second paging message is transmitted based on the paging configuration.

In some examples, to support receiving the paging configuration, the paging configuration component 740 may be configured as or otherwise support a means for receiving a paging identity of the second wireless node, a configuration of a group paging identity of a wireless node group that includes at least the first wireless node and the second wireless node, or a combination thereof.

In some examples, to support receiving the paging configuration, the paging configuration component 740 may be configured as or otherwise support a means for receiving, from a central unit, the paging configuration.

In some examples, the monitoring component 745 may be configured as or otherwise support a means for monitoring, during one or more paging frames, for the first paging message that indicates the second wireless node, where the indication of the first paging message is received based on the monitoring.

In some examples, the one or more paging frames are monitored based on a paging configuration, one or more identities of wireless nodes served by the first wireless node, or a combination thereof.

In some examples, to support monitoring for the first paging message, the monitoring component 745 may be configured as or otherwise support a means for monitoring for the first paging message while the first wireless node is in an inactive or an idle state.

In some examples, the third wireless node is an integrated access and backhaul node or a distributed unit of a base station, the first wireless node is an integrated access and backhaul node, and the second wireless node is an integrated access and backhaul node or a user equipment.

Figure 8:
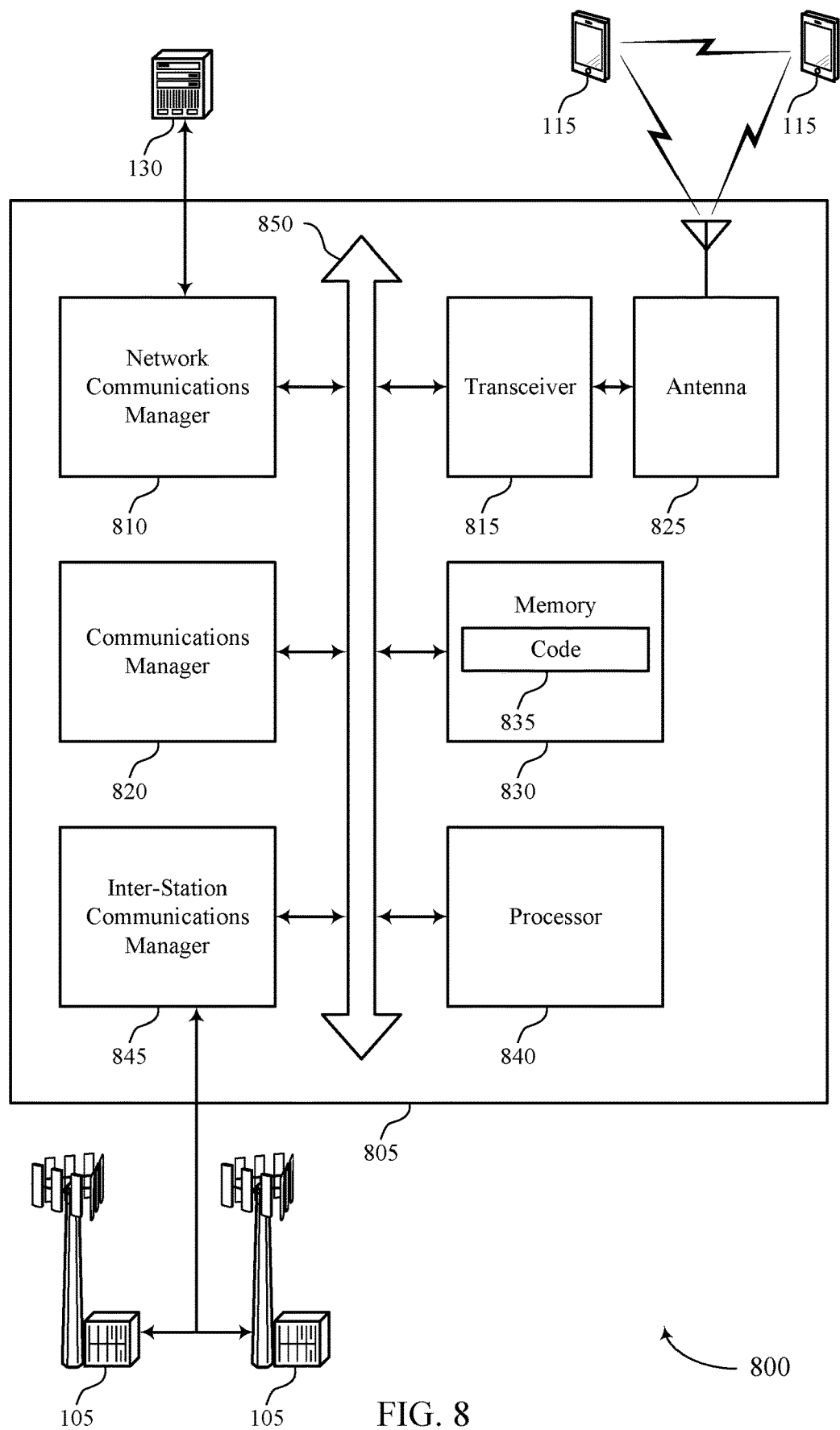
FIG. 8 shows a diagram of a system including a device that supports enhanced paging in wireless backhaul networks in accordance with aspects of the present disclosure.

FIG. 8 shows a diagram of a system 800 including a device 805 that supports enhanced paging in wireless backhaul networks in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting enhanced paging in wireless backhaul networks). For example, the device 805 or a component of the device 805 may include a processor 840 and memory 830 coupled with the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication at a first wireless node in accordance with examples as disclosed herein. For example, the communications manager 820 may be configured as or otherwise support a means for receiving, at a mobile termination unit of the first wireless node, an indication of transmission of a first paging message to a second wireless node by a third wireless node, where the indication of transmission of the first paging message is received from a distributed unit of the third wireless node. The communications manager 820 may be configured as or otherwise support a means for transmitting, by a distributed unit of the first wireless node and based on receiving the indication of transmission of the first paging message, a second paging message to the second wireless node.

By including or configuring the communications manager 820 in accordance with examples as described herein, the device 805 may support techniques for reduced power consumption, improved communication reliability, more efficient utilization of communication resources, and improved coordination between devices. For example, the device 805 may support reduced power consumption associated with paging procedures. The techniques for reduced power consumption may allow the device 805 to reducing the processing overhead at the device 805 and more efficiently transmit paging messages. Additionally or alternatively, the paging procedures described herein may support enhanced communications for the device 805 improving data throughput and reducing an amount of time that the processing units of the device 805 remain powered on for handling wireless communications, further reducing the processing overhead at the device 805.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of enhanced paging in wireless backhaul networks as described herein, or the processor 840 and the memory 830 may be otherwise configured to perform or support such operations.

Figure 9:
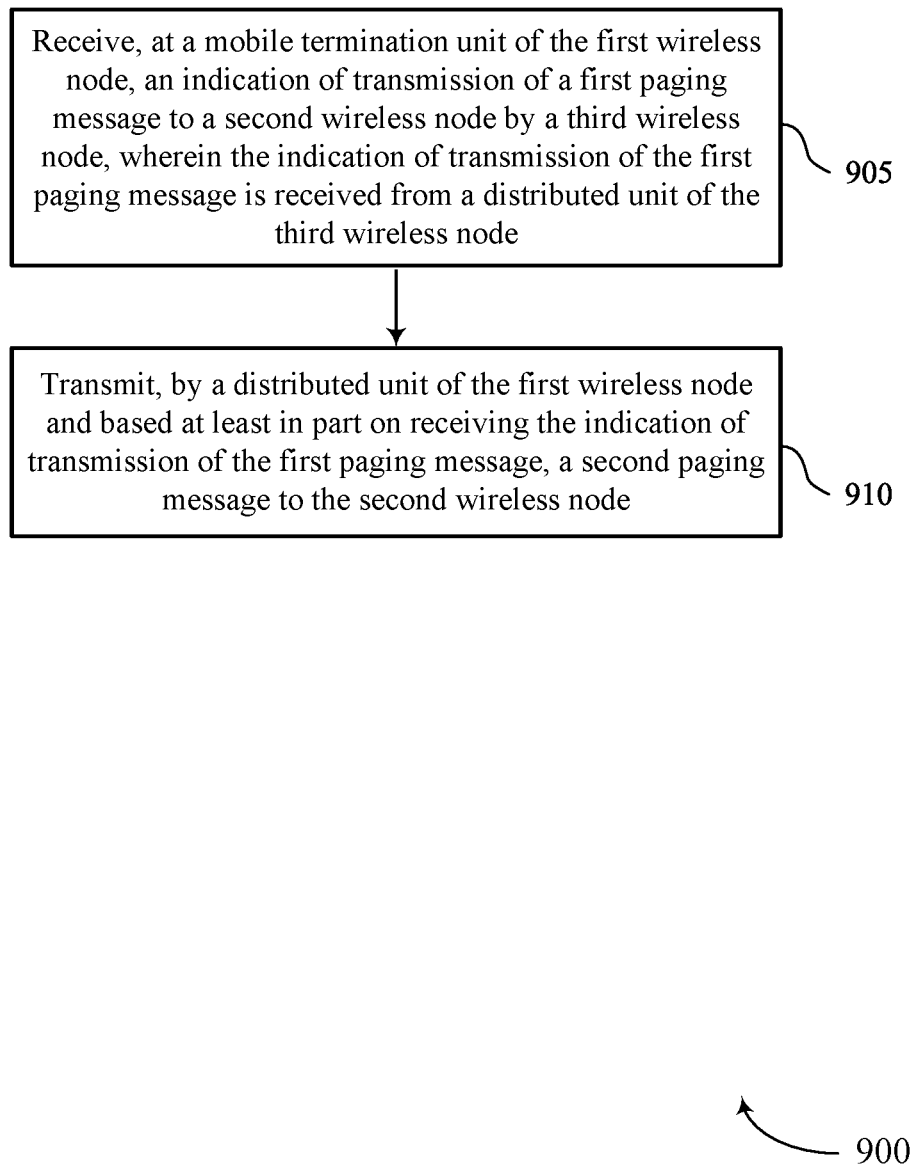
FIGS. 9 and 10 show flowcharts illustrating methods that support enhanced paging in wireless backhaul networks in accordance with aspects of the present disclosure.

FIG. 9 shows a flowchart illustrating a method 900 that supports enhanced paging in wireless backhaul networks in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 905, the method may include receiving, at a mobile termination unit of the first wireless node, an indication of transmission of a first paging message to a second wireless node by a third wireless node, where the indication of transmission of the first paging message is received from a distributed unit of the third wireless node. The operations of 905 may be performed in accordance with examples as disclosed herein. In some examples, aspects of the operations of 905 may be performed by an indication receiver 725 as described with reference to FIG. 7.

At 910, the method may include transmitting, by a distributed unit of the first wireless node and based on receiving the indication of transmission of the first paging message, a second paging message to the second wireless node. The operations of 910 may be performed in accordance with examples as disclosed herein. In some examples, aspects of the operations of 910 may be performed by a paging message transmitter 730 as described with reference to FIG. 7.

Figure 10:
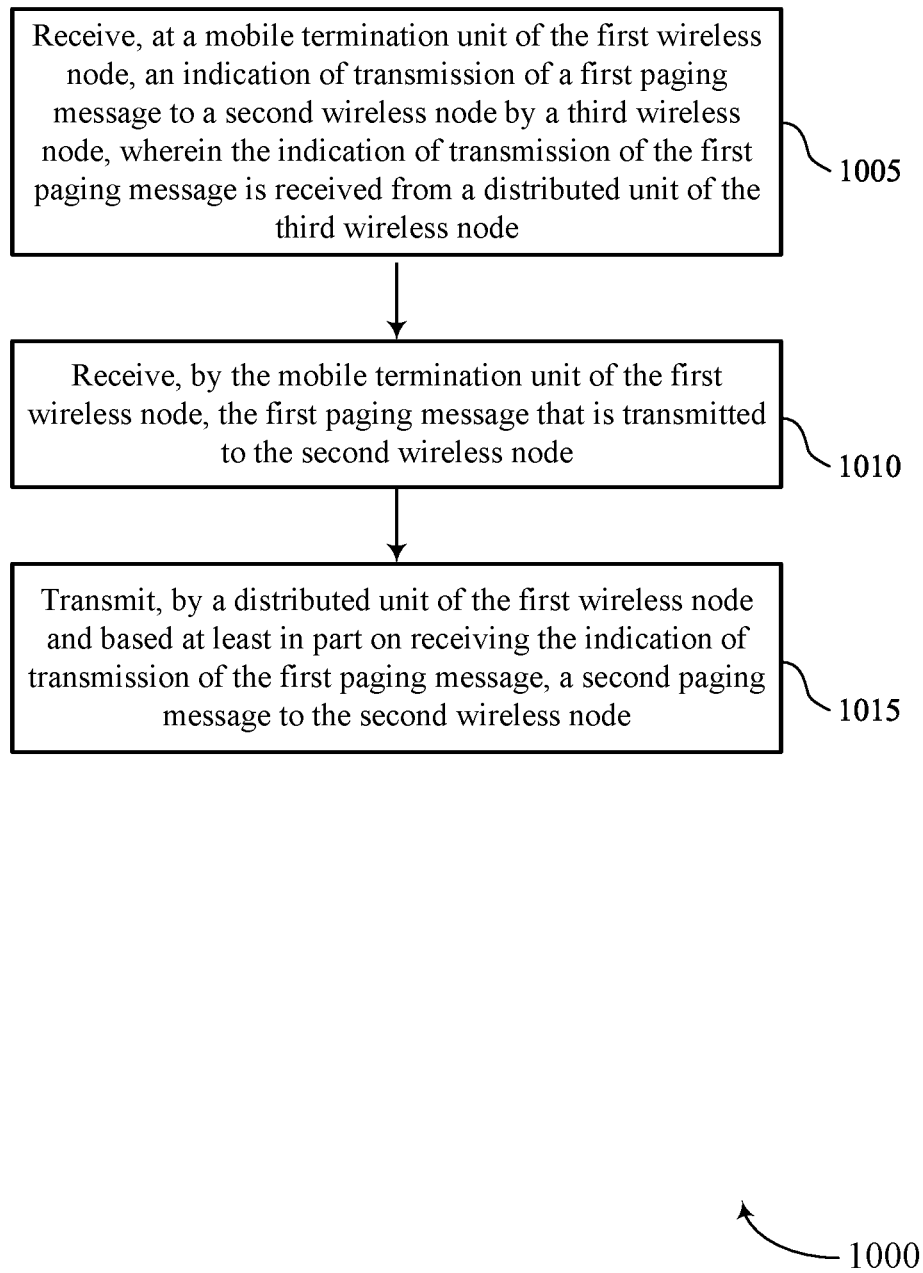

FIG. 10 shows a flowchart illustrating a method 1000 that supports enhanced paging in wireless backhaul networks in accordance with aspects of the present disclosure. The operations of the method 1000 may be implemented by a base station or its components as described herein. For example, the operations of the method 1000 may be performed by a base station 105 as described with reference to FIGS. 1 through 8. In some examples, a base station may execute a set of instructions to control the functional elements of the base station to perform the described functions. Additionally or alternatively, the base station may perform aspects of the described functions using special-purpose hardware.

At 1005, the method may include receiving, at a mobile termination unit of the first wireless node, an indication of transmission of a first paging message to a second wireless node by a third wireless node, where the indication of transmission of the first paging message is received from a distributed unit of the third wireless node. The operations of 1005 may be performed in accordance with examples as disclosed herein. In some examples, aspects of the operations of 1005 may be performed by an indication receiver 725 as described with reference to FIG. 7.

At 1010, the method may include receiving, by the mobile termination unit of the first wireless node, the first paging message that is transmitted to the second wireless node. The operations of 1010 may be performed in accordance with examples as disclosed herein. In some examples, aspects of the operations of 1010 may be performed by an indication receiver 725 as described with reference to FIG. 7.

At 1015, the method may include transmitting, by a distributed unit of the first wireless node and based on receiving the indication of transmission of the first paging message, a second paging message to the second wireless node. The operations of 1015 may be performed in accordance with examples as disclosed herein. In some examples, aspects of the operations of 1015 may be performed by a paging message transmitter 730 as described with reference to FIG. 7.

The following provides an overview of aspects of the present disclosure:

Aspect 1: A method for wireless communication at a first wireless node, comprising: receiving, at a mobile termination unit of the first wireless node, an indication of transmission of a first paging message to a second wireless node by a third wireless node, wherein the indication of transmission of the first paging message is received from a distributed unit of the third wireless node; and transmitting, by a distributed unit of the first wireless node and based at least in part on receiving the indication of transmission of the first paging message, a second paging message to the second wireless node.

Aspect 2: The method of aspect 1, wherein receiving the indication of transmission of the first paging message comprises: receiving, by the mobile termination unit of the first wireless node, the first paging message that is transmitted to the second wireless node.

Aspect 3: The method of aspect 1, wherein receiving the indication of transmission of the first paging message comprises: receiving a paging identity of the second wireless node, wherein the paging identity comprises an inactive radio network temporary identifier or a serving temporary mobile subscriber identity of the second wireless node.

Aspect 4: The method of aspect 1, wherein receiving the indication of transmission of the first paging message comprises: receiving an indication of an index value that maps to an identity of the second wireless node.

Aspect 5: The method of aspect 4, further comprising: determining a paging frame to use to transmit the second paging message based at least in part on the index value, wherein the second paging message is transmitted to the second wireless node using the paging frame.

Aspect 6: The method of aspect 1, wherein receiving the indication of transmission of the first paging message comprises: receiving a group paging identity that corresponds to a wireless node group including the first wireless node and the second wireless node.

Aspect 7: The method of aspect 6, wherein the group paging identity is mapped to an identity of the mobile termination unit of the first wireless node and an identity of the second wireless node.

Aspect 8: The method of aspect 1, wherein receiving the indication of transmission of the first paging message comprises: receiving the first paging message that includes a first paging record identifying the second wireless node, a second paging record identifying the first wireless node, or both.

Aspect 9: The method of aspect 1, wherein receiving the indication of transmission of the first paging message comprises: receiving, from the third wireless node over a communication link established between the first wireless node and the third wireless node, a request to page the second wireless node, wherein the first wireless node transmits the second paging message based at least in part on receiving the request.

Aspect 10: The method of aspect 9, wherein the third wireless node is a parent node of the first wireless node and the request is received by the mobile termination unit of the first wireless node and from the distributed unit of the third wireless node.

Aspect 11: The method of any of aspects 9 through 10, wherein receiving the request comprises: receiving a downlink control information message, a medium access control layer control element message, a sidelink control information message, or backhaul adaptation protocol layer protocol data unit message.

Aspect 12: The method of aspect 1, wherein receiving the indication of transmission of the first paging message comprises: receiving an indication of one or more cell identifiers of cells served by the first wireless node, wherein the second paging message is transmitted in the cells corresponding to the one or more cell identifiers.

Aspect 13: The method of aspect 1, wherein receiving the indication of transmission of the first paging message comprises: receiving an indication of paging information that includes a paging discontinuous reception cycle, a paging priority, a paging origin, or a combination thereof, wherein the second paging message is transmitted based at least in part on the paging information.

Aspect 14: The method of aspect 1, wherein receiving the indication of transmission of the first paging message comprises: receiving an indication of a plurality of wireless nodes that are to be paged, wherein the plurality of wireless nodes includes the second wireless node, wherein the second paging message includes indications of each wireless node of the plurality of wireless nodes.

Aspect 15: The method of any of aspects 1 through 14, further comprising: receiving a paging configuration for the first wireless node to use for paging other wireless nodes in response to receiving paging messages for the other wireless nodes, wherein the second paging message is transmitted based at least in part on the paging configuration.

Aspect 16: The method of aspect 15, wherein receiving the paging configuration comprises: receiving a paging identity of the second wireless node, a configuration of a group paging identity of a wireless node group that includes at least the first wireless node and the second wireless node, or a combination thereof.

Aspect 17: The method of any of aspects 15 through 16, wherein receiving the paging configuration comprises: receiving, from a central unit, the paging configuration.

Aspect 18: The method of any of aspects 1 through 17, further comprising: monitoring, during one or more paging frames, for the first paging message that indicates the second wireless node, wherein the indication of transmission of the first paging message is received based at least in part on the monitoring.

Aspect 19: The method of aspect 18, wherein the one or more paging frames are monitored based at least in part on a paging configuration, one or more identities of wireless nodes served by the first wireless node, or a combination thereof.

Aspect 20: The method of any of aspects 18 through 19, wherein monitoring for the first paging message comprises: monitoring for the first paging message while the first wireless node is in an inactive or an idle state.

Aspect 21: The method of any of aspects 1 through 20, wherein the third wireless node is an integrated access and backhaul node or a distributed unit of a base station, the first wireless node is an integrated access and backhaul node, and the second wireless node is an integrated access and backhaul node or a user equipment.

Aspect 22: An apparatus for wireless communication at a first wireless node, comprising a processor; memory coupled with the processor; and instructions stored in the memory and executable by the processor to cause the apparatus to perform a method of any of aspects 1 through 21.

Aspect 23: An apparatus for wireless communication at a first wireless node, comprising at least one means for performing a method of any of aspects 1 through 21.

Aspect 24: A non-transitory computer-readable medium storing code for wireless communication at a first wireless node, the code comprising instructions executable by a processor to perform a method of any of aspects 1 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first integrated access and backhaul node, comprising:
   monitoring, at a mobile termination unit of the first integrated access and backhaul node, for a first paging message that indicates a second wireless node;
   receiving, at the mobile termination unit of the first integrated access and backhaul node and from a distributed unit of a third integrated access and backhaul node based at least in part on the monitoring, the first paging message transmitted from the third integrated access and backhaul node to the second wireless node, wherein the first integrated access and backhaul node, the second wireless node, and the third integrated access and backhaul node are distinct and wherein the second wireless node comprises a second integrated access and backhaul node or a user equipment; and
   transmitting, by a distributed unit of the first integrated access and backhaul node and based at least in part on receiving the first paging message, a second paging message to the second wireless node.

2. The method of claim 1, wherein receiving the first paging message comprises:
   receiving a paging identity of the second wireless node, wherein the paging identity comprises an inactive radio network temporary identifier or a serving temporary mobile subscriber identity of the second wireless node.

3. The method of claim 1, wherein receiving the first paging message comprises:
   receiving an indication of an index value that maps to an identity of the second wireless node.

4. The method of claim 3, further comprising:
   determining a paging frame to use to transmit the second paging message based at least in part on the index value, wherein the second paging message is transmitted to the second wireless node using the paging frame.

5. The method of claim 1, wherein receiving the first paging message comprises:
   receiving a group paging identity that corresponds to a wireless node group including the first integrated access and backhaul node and the second wireless node.

6. The method of claim 5, wherein the group paging identity is mapped to an identity of the mobile termination unit of the first integrated access and backhaul node and an identity of the second wireless node.

7. The method of claim 1, wherein receiving the first paging message comprises:
   receiving the first paging message that includes a first paging record identifying the second wireless node, a second paging record identifying the first integrated access and backhaul node, or both.

8. The method of claim 1, wherein receiving the first paging message comprises:

receiving, from the third integrated access and backhaul node over a communication link established between the first integrated access and backhaul node and the third integrated access and backhaul node, a request to page the second wireless node, wherein the first integrated access and backhaul node transmits the second paging message based at least in part on receiving the request.

9. The method of claim 8, wherein the third integrated access and backhaul node is a parent node of the first integrated access and backhaul node.

10. The method of claim 8, wherein receiving the request comprises:
receiving a downlink control information message, a medium access control layer control element message, a sidelink control information message, or backhaul adaptation protocol layer protocol data unit message.

11. The method of claim 1, wherein receiving the first paging message comprises:
receiving an indication of one or more cell identifiers of cells served by the first integrated access and backhaul node, wherein the second paging message is transmitted in the cells corresponding to the one or more cell identifiers.

12. The method of claim 1, wherein receiving the first paging message comprises:
receiving an indication of paging information that includes a paging discontinuous reception cycle, a paging priority, a paging origin, or a combination thereof, wherein the second paging message is transmitted based at least in part on the paging information.

13. The method of claim 1, wherein receiving the first paging message comprises:
receiving an indication of a plurality of wireless nodes that are to be paged, wherein the plurality of wireless nodes includes the second wireless node, wherein the second paging message includes indications of each wireless node of the plurality of wireless nodes.

14. The method of claim 1, further comprising:
receiving a paging configuration for the first integrated access and backhaul node to use for paging other wireless nodes in response to receiving paging messages for the other wireless nodes, wherein the second paging message is transmitted based at least in part on the paging configuration.

15. The method of claim 14, wherein receiving the paging configuration comprises:
receiving a paging identity of the second wireless node, a configuration of a group paging identity of a wireless node group that includes at least the first integrated access and backhaul node and the second wireless node, or a combination thereof.

16. The method of claim 14, wherein receiving the paging configuration comprises:
receiving, from a central unit, the paging configuration.

17. The method of claim 1, wherein monitoring for the first paging message comprises:
monitoring, at the mobile termination unit of the first integrated access and backhaul node during one or more paging frames, for the first paging message that indicates the second wireless node.

18. The method of claim 17, wherein the one or more paging frames are monitored based at least in part on a paging configuration, one or more identities of wireless nodes served by the first integrated access and backhaul node, or a combination thereof.

19. The method of claim 17, wherein monitoring for the first paging message comprises:
monitoring, at the mobile termination unit of the first integrated access and backhaul node, for the first paging message while the first integrated access and backhaul node is in an inactive or an idle state.

20. An apparatus for wireless communication at a first integrated access and backhaul node, comprising:
a processor;
memory coupled with the processor; and
instructions stored in the memory and executable by the processor to cause the apparatus to:
monitor, at a mobile termination unit of the first integrated access and backhaul node, for a first paging message that indicates a second wireless node;
receive, at the mobile termination unit of the first integrated access and backhaul node and from a distributed unit of a third integrated access and backhaul node based at least in part on the monitoring, the first paging message transmitted from the third integrated access and backhaul node to the second wireless node, wherein the first integrated access and backhaul node, the second wireless node, and the third integrated access and backhaul node are distinct and wherein the second wireless node comprises a second integrated access and backhaul node or a user equipment; and
transmit, by a distributed unit of the first integrated access and backhaul node and based at least in part on receiving the first paging message, a second paging message to the second wireless node.

21. The apparatus of claim 20, wherein the instructions to receive the first paging message are executable by the processor to cause the apparatus to:
receive a paging identity of the second wireless node, wherein the paging identity comprises an inactive radio network temporary identifier or a serving temporary mobile subscriber identity of the second wireless node.

22. The apparatus of claim 20, wherein the instructions to receive the first paging message are executable by the processor to cause the apparatus to:
receive an indication of an index value that maps to an identity of the second wireless node.

23. The apparatus of claim 20, wherein the instructions to receive the first paging message are executable by the processor to cause the apparatus to:
receive a group paging identity that corresponds to a wireless node group including the first integrated access and backhaul node and the second wireless node.

24. The apparatus of claim 20, wherein the instructions to receive the first paging message are executable by the processor to cause the apparatus to:
receive the first paging message that includes a first paging record identifying the second wireless node, a second paging record identifying the first integrated access and backhaul node, or both.

25. The apparatus of claim 20, wherein the instructions to receive the first paging message are executable by the processor to cause the apparatus to:
receive, from the third integrated access and backhaul node over a communication link established between the first integrated access and backhaul node and the third integrated access and backhaul node, a request to page the second wireless node, wherein the first integrated access and backhaul node transmits the second paging message based at least in part on receiving the request.

26. An apparatus for wireless communication at a first integrated access and backhaul node, comprising:
means for monitoring, at a mobile termination unit of the first integrated access and backhaul node, for a first paging message that indicates a second wireless node;
means for receiving, at the mobile termination unit of the first integrated access and backhaul node and from a distributed unit of a third integrated access and backhaul node based at least in part on the monitoring, the first paging message transmitted from the third integrated access and backhaul node to the second wireless node, wherein the first integrated access and backhaul node, the second wireless node, and the third integrated access and backhaul node are distinct and wherein the second wireless node comprises a second integrated access and backhaul node or a user equipment; and
means for transmitting, by a distributed unit of the first integrated access and backhaul node and based at least in part on receiving the first paging message, a second paging message to the second wireless node.

27. A non-transitory processor-readable medium storing code for wireless communication at a first integrated access and backhaul node, the code comprising instructions executable by a processor to:
monitor, at a mobile termination unit of the first integrated access and backhaul node, for a first paging message that indicates a second wireless node;
receive, at the mobile termination unit of the first integrated access and backhaul node and from a distributed unit of a third integrated access and backhaul node based at least in part on the monitoring, the first paging message transmitted from the third integrated access and backhaul node to the second wireless node, wherein the first integrated access and backhaul node, the second wireless node, and the third integrated access and backhaul node are distinct and wherein the second wireless node comprises a second integrated access and backhaul node or a user equipment; and
transmit, by a distributed unit of the first integrated access and backhaul node and based at least in part on receiving the first paging message, a second paging message to the second wireless node.

28. The apparatus of claim 22, wherein the instructions are executable by the processor to cause the apparatus to:
determine a paging frame to use to transmit the second paging message based at least in part on the index value, wherein the second paging message is transmitted to the second wireless node using the paging frame.

29. The apparatus of claim 23, wherein the group paging identity is mapped to an identity of the mobile termination unit of the first integrated access and backhaul node and an identity of the second wireless node.

30. The apparatus of claim 25, wherein the third integrated access and backhaul node is a parent node of the first integrated access and backhaul node.

* * * * *